(12) United States Patent
Takai et al.

(10) Patent No.: US 7,482,070 B2
(45) Date of Patent: Jan. 27, 2009

(54) MAGNETIC RECORDING MEDIUM

(75) Inventors: Mitsuru Takai, Chuo-ku (JP);
Yoshikazu Soeno, Chuo-ku (JP);
Katsumichi Tagami, Chuo-ku (JP);
Kazuya Shimakawa, Chuo-ku (JP)

(73) Assignee: TDK Corporation, Tokyo (JP)

( * ) Notice: Subject to any disclaimer, the term of this patent is extended or adjusted under 35 U.S.C. 154(b) by 703 days.

(21) Appl. No.: 11/115,116

(22) Filed: Apr. 27, 2005

(65) Prior Publication Data
US 2005/0243467 A1 Nov. 3, 2005

(30) Foreign Application Priority Data
Apr. 30, 2004 (JP) ............... 2004-135866

(51) Int. Cl.
*G11B 5/66* (2006.01)

(52) U.S. Cl. .................... 428/836; 428/848.5

(58) Field of Classification Search .............. 428/836, 428/848.5
See application file for complete search history.

(56) References Cited

U.S. PATENT DOCUMENTS 6,014,296 A * 1/2000 Ichihara et al. ............. 360/135
6,051,299 A 4/2000 Uchiyama et al.
6,347,016 B1 * 2/2002 Ishida et al. ................. 360/17
2004/0209123 A1 * 10/2004 Bajorek et al. ......... 428/694 TP

FOREIGN PATENT DOCUMENTS

| JP | A 04-251915 | 9/1992 |
| JP | B2 05-22291 | 3/1993 |
| JP | A 09-097419 | 4/1997 |
| JP | A 10-222944 | 8/1998 |

* cited by examiner

*Primary Examiner*—Holly Rickman
(74) *Attorney, Agent, or Firm*—Oliff & Berridge, PLC (57) ABSTRACT

A magnetic recording medium having high reliability is provided, in which concave portions between recording elements formed as convex portions of a concavo-convex pattern are approximately completely filled with a non-magnetic material. The magnetic recording medium is a plate-like body including: a substrate; a recording layer that is formed in a predetermined concavo-convex pattern over the substrate and includes recording elements for recording information formed as convex portions of the concavo-convex pattern; and the non-magnetic material filling concave portions between the recording elements. Side faces of the recording elements are inclined to face a surface of the plate-like body on a side toward which the recording elements 16 project in the concavo-convex pattern. An inclination angle of the side faces of the recording elements with respect to a direction perpendicular to that surface is smaller than 90° and 5° or more.

8 Claims, 5 Drawing Sheets

MAGNETIC RECORDING MEDIUM

BACKGROUND OF THE INVENTION

1. Field of the Invention

The present invention relates to a magnetic recording medium including a recording layer formed in a predetermined concavo-convex pattern in which recording elements for recording information are formed as convex portions thereof.

2. Description of the Related Art

Conventionally, various types of development such as miniaturization of magnetic particles forming a recording layer, change of a material of the magnetic particles, and improvement of fine head processing have been made for magnetic recording media such as hard discs in order to largely improve the areal density of the recording layer. The improvement of the areal density is expected to continue.

However, many problems including the limitation of the head processing, erroneous information recording to a track adjacent to a target track caused by broadening of a magnetic field, crosstalk during reproduction, and the like are made apparent. This means the improvement of the areal density by the conventional development approaches has already reached the limit. Magnetic recording media such as discrete track media and patterned media, in which a recording layer is formed in a predetermined concavo-convex pattern and recording elements for recording information are formed as convex portions of the concavo-convex pattern, have been proposed as prospective magnetic recording media capable of further improvements in areal density (see Japanese Patent Laid-Open Publications Nos. Hei 10-222944 and Hei 9-97419, for example). In those magnetic recording media, it is considered that the side faces of the recording element that are approximately perpendicular to a surface thereof are preferable, as described in Japanese Patent Laid-Open Publication No. Hei 10-222944, for example.

Erroneous information recording to a track adjacent to a target track, crosstalk and the like can be suppressed by recording information to the recording elements formed as the convex portions.

On the other hand, in the case where the surface of the magnetic recording medium is formed in a concavo-convex pattern, the flying height of a head is unstable. This may degrade the recording and reproduction characteristics. Thus, it is preferable to planarize the surface of the magnetic recording medium by depositing a non-magnetic material on the recording layer of the concavo-convex pattern so that concave portions between the recording elements are filled with the non-magnetic material and then removing the excess non-magnetic material on the recording elements. Moreover, the side face of the recording element can be easily damaged by processing. The damage of the side face may degrade the magnetic characteristics. When the damage of the side face of the recording element is left as it is, corrosion or oxidization caused by moisture, oxygen in the air or the like may progress to further degrade the magnetic characteristics. However, when the non-magnetic material comes into close contact with the side face of the recording element, contact of moisture, oxygen or the like with the side face of the recording element can be suppressed. For this reason, filling the concave portions between the recording elements with the non-magnetic material is preferable.

Dry etching can be used for processing the recording layer in a concavo-convex pattern. Various dry etching methods have been developed in order to process the side faces of the convex portions of the concavo-convex pattern to be approximately perpendicular to the surfaces of the convex portions. Moreover, deposition techniques used in the art of semiconductor manufacturing, such as sputtering, can be used for depositing the non-magnetic material. In addition, process techniques used in the art of semiconductor manufacturing, such as CMP (Chemical Mechanical Polishing), can be used as a technique for removing the excess non-magnetic material on the recording layer to planarize the surface of the recording layer and non-magnetic material.

However, it is difficult to completely fill the concave portions between the recording elements with the non-magnetic material even when the non-magnetic material is deposited on the recording layer of the concavo-convex pattern by the above technique. That is, voids are often formed in the concave portions. Such voids may allow for entrance of moisture, air, or the like thereto. The entering moisture, air, or the like cause corrosion or oxidization of the side faces of the recording elements, which may degrade the magnetic characteristics.

SUMMARY OF THE INVENTION

In view of the foregoing problems, various exemplary embodiments of this invention provide a magnetic recording medium having high reliability in which concave portions of a concavo-convex pattern between convex portions serving as recording elements are approximately completely filled with a non-magnetic material.

Various exemplary embodiments of the present invention achieve the above object by forming the recording elements in such a manner that the side face of each recording element is inclined to face a surface of the recording medium on a side toward which the recording element projects and setting an inclination angle of the side face with respect to a direction perpendicular to that surface to be smaller than 90° and 5° or more.

When the side faces of the recording elements are inclined to face the surface thereof, the non-magnetic material can easily enter the concave portions, thus providing an effect of preventing or suppressing generation of voids in the concave portions. In the case where the recording elements are formed as the convex portions of the concavo-convex pattern, the side faces of the recording elements were usually formed to be as perpendicular as possible with respect to the surface thereof. However, this invention aims to improve the reliability of the magnetic recording medium by inclining the side faces of the recording elements to face the surface thereof. That is, this invention is based on a concept quite different from the conventional concept.

Accordingly, various exemplary embodiments of the present invention provide a magnetic recording medium being a plate-like body and comprising:

a substrate;

a recording layer formed in a predetermined concavo-convex pattern over the substrate, the recording layer including recording elements for recording information formed as convex portions of the concavo-convex pattern; and a non-magnetic material filling concave portions between the recording elements, wherein side faces of the recording elements are inclined to face a surface of the plate-like body on a side toward which the recording elements project in the concavo-convex pattern, and an inclination angle of the side faces of the recording elements with respect to a direction perpendicular to the surface is smaller than 90° and 5° or more.

The term "recording layer which is formed in a predetermined concavo-convex pattern over a substrate and includes recording elements for recording information formed as convex portions of the concavo-convex pattern" used herein means to include a recording layer divided into a number of recording elements, a recording layer which is partially divided in such a manner that a part of recording elements continue, a continuous recording layer formed on a part of a substrate such as a spirally formed recording layer, and a continuous recording layer including both convex portions and concave portions.

The term "magnetic recording medium" used herein means to include a medium that only uses magnetic for recording and reproducing information, such as a hard disc, a floppy (registered trademark) disc, and a magnetic tape, as well as a magneto optical recording medium that uses both magnetism and light, such as an MO (Magneto Optical) and a heat-assisted recording medium that uses both magnetism and heat.

The term "convex portions of a concavo-convex pattern" used herein means projecting portions in a concavo-convex shape in cross section perpendicular to a surface of a recording medium.

The term "microcrystalline material" used herein means a material that does not show a crystalline peak in X-ray diffraction.

According to the present invention, the side faces of the recording elements are inclined to face the surface. Thus, a non-magnetic material can easily enter the concave portions between the recording elements and the concave portions can be approximately completely filled with the non-magnetic material.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
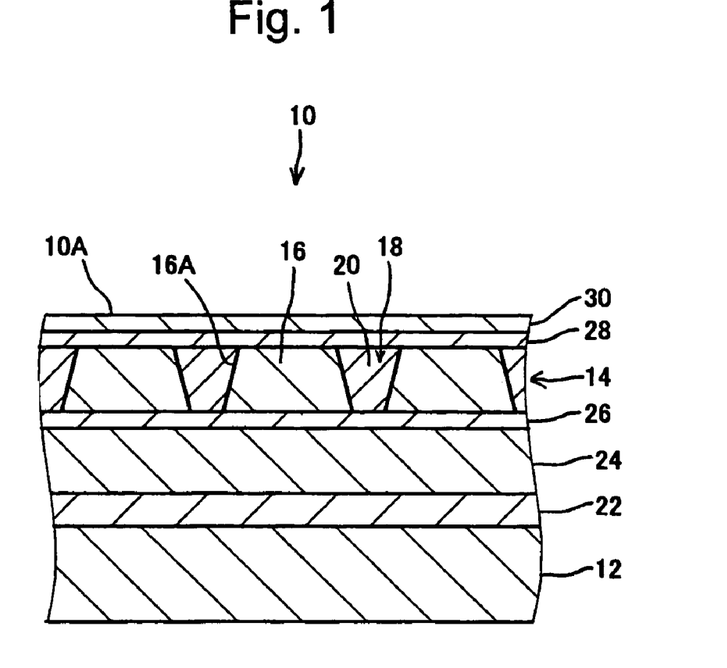
FIG. 1 is a schematic cross-sectional side view showing a structure of a magnetic recording medium according to an exemplary embodiment of the present invention.

A magnetic recording medium 10 of this exemplary embodiment is a perpendicular recording type discrete track magnetic disc. The magnetic recording medium 10 includes a substrate 12, a recording layer 14 formed in a concavo-convex pattern over the substrate 12, as shown in FIG. 1. Recording elements 16 for recording information are formed as convex portions of the concavo-convex pattern. Concave portions 18 between the recording elements 16 are filled with a non-magnetic material 20.

Figure 2:
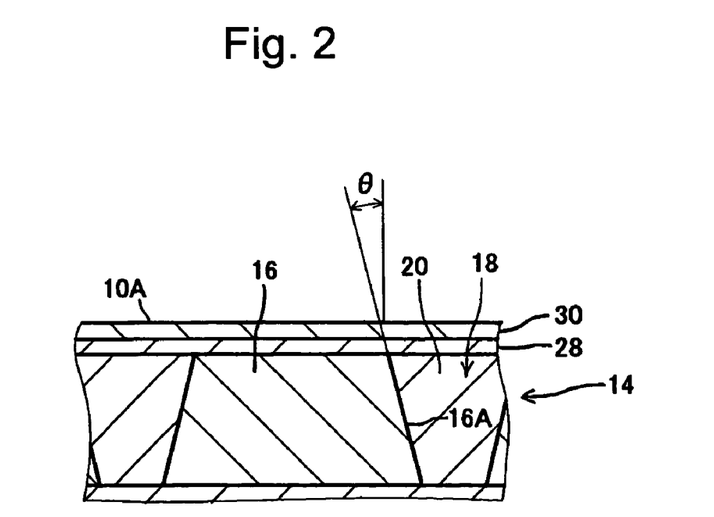
FIG. 2 is a cross-sectional side view showing the structure of the magnetic recording medium while enlarging it.

The magnetic recording medium 10 has a feature described below. A side face 16A of the recording element 16 is inclined to face one surface 10A of the magnetic recording medium 10, as shown in FIG. 2 which is an enlarged view of the recording elements 16. The surface 10A is on a side of the recording medium 10 toward which the recording element 16 projects in the concavo-convex pattern. An inclination angle θ of the side face 16A of the recording element 16 with respect to a direction perpendicular to the surface 10A is set to be 5° or more and 45° or less. Since the other features are considered not important in understanding the present exemplary embodiment, description thereof will be omitted when appropriate.

An underlayer 22, a soft magnetic layer 24, and a seed layer 26 are formed over the substrate 12 in that order in the magnetic recording medium 10. The aforementioned recording layer 14 is formed in a concavo-convex pattern on the seed layer 26. A protective layer 28 and a lubricating layer 30 are formed over the recording layer 14 in that order.

The substrate 12 is made of glass. A non-magnetic material having high rigidity, such as Al (aluminum) or $Al_2O_3$ (alumina) may be used as the material of the substrate 12.

The recording layer 14 has a thickness of 5 to 25 nm and is formed of a CoCrPt (cobalt-chrome-platinum) alloy. The concave portions 18 are formed to reach a substrate-side surface of the recording layer 14. That is, the recording layer 14 is formed only at the convex portions of the concavo-convex pattern.

In a data region, the recording elements 16 are concentrically arranged in a radial direction of the magnetic recording medium 10 at a pitch of 200 nm or less. In a servo region, the recording elements 16 are arranged in a predetermined pattern of servo information and the like.

The concave portions 18 between the recording elements 16 are almost completely filled with the non-magnetic material 20. A major component of the non-magnetic material 20 is $SiO_2$ (silicon dioxide) having an amorphous structure containing no crystalline grain boundary. Alternatively, microcrystalline material may be used as the non-magnetic material 20. A surface of the non-magnetic material 20 is substantially coincident with a surface of the recording layer 14, and upper surfaces of the recording elements 16 and the non-magnetic material 20 are planarized.

The protective layer 28 has a thickness of 1 to 5 nm and is formed of a hard carbon film called as diamond-like carbon. In this application, the term "diamond-like carbon (hereinafter called "DLC")" is used as the meaning of a material which is mainly composed of carbon, has amorphous structure, and has a hardness of approximately $2 \times 10^9$ to $8 \times 10^{10}$ Pa measured by a Vickers hardness test. The lubricating layer 30 has a thickness of 1 to 2 nm and is formed of PFPE (perfluoropolyether).

The operation of the magnetic recording medium 10 is now described.

In the magnetic recording medium 10, the side face 16A of the recording element 16 is inclined to face the surface 10A and the inclination angle θ is set to be 5☐ or more. Thus, the non-magnetic material 20 can easily enter the concave portions 18. The concave portions 18 are almost completely filled with the non-magnetic material 20 in such a manner that the non-magnetic material 20 is in close contact with the side faces 16A of the recording elements 16. This prevents or largely reduces corrosion of the recording element 16 caused by moisture or the like entering voids in the concave portion 18 or oxidation of the side face 16A of the recording element 16 caused by oxygen or the like entering the voids in the concave portion 18. Therefore, favorable magnetic characteristics can be surely obtained. Even when the side face 16A of the recording element 16 was damaged by processing, for example, progress of corrosion or oxidization caused by moisture or oxygen that comes into contact with the damaged portion of the side face 16A can be prevented or suppressed. This is because the concave portion 18 is almost completely filled with the non-magnetic material 20 so that the non-magnetic material 20 is in close contact with the side face 16A. Thus, favorable magnetic characteristics can be obtained. In other words, the magnetic recording medium 10 has high reliability.

In the case where the inclination angle θ is excessively large, an area of the side face 16A that may be damaged by processing becomes large, thus degrading the magnetic characteristics of the recording element 16. In addition, adjacent recording elements 16 may get excessively close to each other or may connect with each other to become a continuous form when the inclination angle θ is excessively large. Thus, the recording and reproduction characteristics of the magnetic recording medium 10 may possibly be degraded for that reason. However, the inclination angle θ is 45° or less in this exemplary embodiment. Thus, favorable magnetic characteristics of the recording element 16 are obtained. A relationship between the inclination angle θ and the magnetic characteristics of the recording element 16 is further described later.

As the width of the concave portion 18 becomes narrower or the recording layer 14 becomes thicker, the adjacent recording elements 16 come closer even if the inclination angle θ is not changed. In the case where the recording elements 16 are formed at a pitch of 200 nm or less, as in the present exemplary embodiment, it is considered that the width of the concave portion 18 (measured at the height of the upper surface of the recording elements 16) is reduced to about 50 nm. When the maximum thickness of the recording layer 14 is 25 nm, as in the present exemplary embodiment, it is possible to prevent the adjacent recording elements 16 from connecting with each other by setting the inclination angle θ to be 45° or less.

The magnetic recording medium 10 has high areal density because the recording elements 16 are arranged in the radial direction at a pitch of 200 nm or less in the data region. Although the areal density is high, erroneous information recording to a recording element 16 adjacent to a target recording element 16, crosstalk during reproduction, and the like can be suppressed because the recording elements 16 are formed as the convex portions of the concavo-convex pattern. In addition, since the recording elements 16 are formed only at the positions of the convex portions of the concavo-convex pattern, magnetic noises are not generated from the concave portions 18. This improves the recording and reproduction characteristics of the recording layer 14. The surface of the lubricating layer 30 is flat in the magnetic recording medium 10, because the concave portions 18 are filled with the non-magnetic material 20 and the upper surfaces of the recording elements 16 and the non-magnetic material 20 are planarized. Thus, the changing amount of the flying height of a head can be suppressed to be small.

The recording layer 14 has a thickness of 5 to 25 nm in the magnetic recording medium 10. Therefore, the processed amount of the recording layer 14 is small and the magnetic recording medium 10 has good productivity. Although it was conventionally considered that the magnetic characteristics of the perpendicular recording type magnetic recording medium were improved as the recording layer became thicker, the inventors of the present invention confirmed that the magnetic recording medium including the recording layer 14 having a thickness of 5 to 25 nm had the magnetic characteristics that were the same as or better than a magnetic recording medium including a thicker recording layer. In other words, setting the thickness of the recording layer 14 to be in a range from 5 to 25 nm provides the favorable productivity and the favorable magnetic characteristics.

Figure 3:
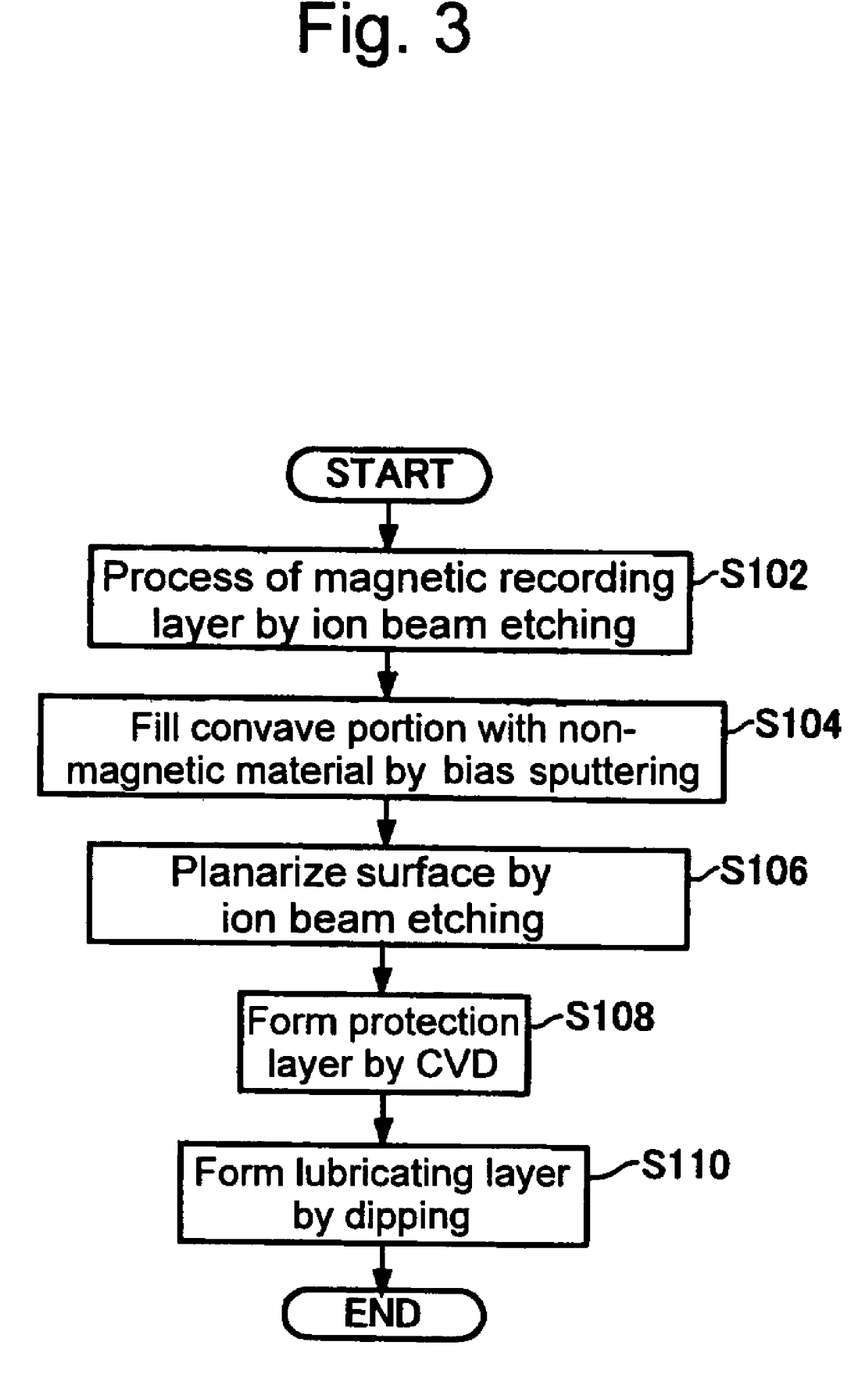
FIG. 3 is a general flowchart of a manufacturing process of the magnetic recording medium.

Next, a manufacturing method of the magnetic recording medium 10 is briefly described based on a flowchart of FIG. 3.

Figure 4:
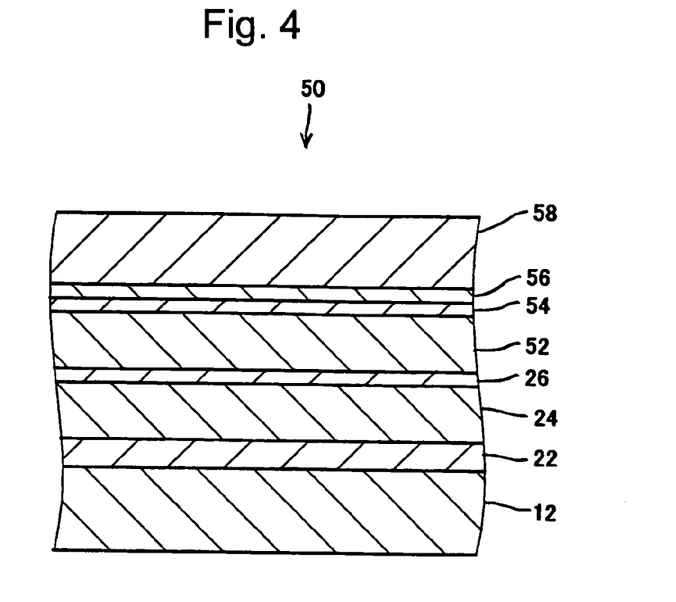
FIG. 4 is a schematic cross-sectional side view showing a starting body of an object to be processed in the manufacturing process.
Figure 5:
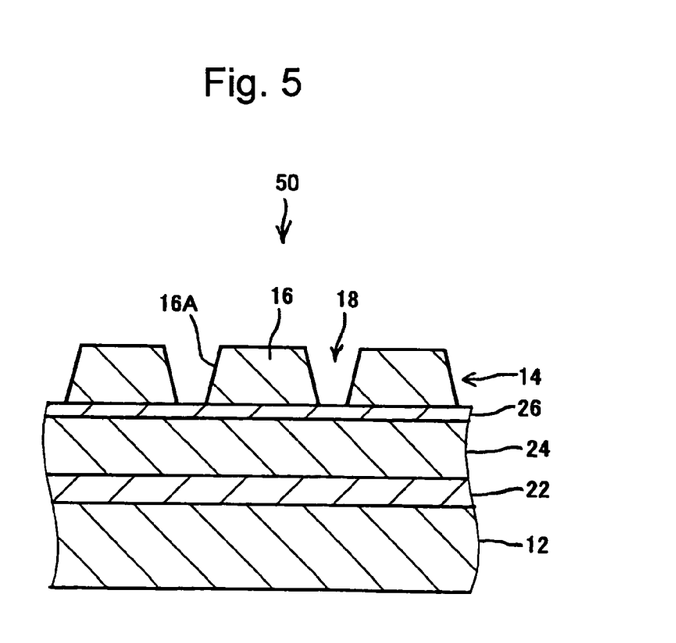
FIG. 5 is a schematic cross-sectional side view showing a shape of the object to be processed in which recording elements are formed on its surface.

First, a starting body of an object to be processed 50 shown in FIG. 4 is processed, thereby dividing a continuous recording layer 52 into recording elements 16 to form a recording layer 14 as shown in FIG. 5 (Step S102).

The starting body of the object to be processed 50 is obtained by forming the underlayer 22, the soft magnetic layer 24, the seed layer 26, the continuous recording layer 52, a first mask layer 54, and a second mask layer 56 over the substrate 12 by sputtering in that order and then applying a resist layer 58 onto the second mask layer 56 by spin coating. Alternatively, the resist layer 58 may be applied by dipping.

The continuous recording layer 52 corresponds to the recording layer 14 before processing. The continuous recording layer 52 and the recording layer 14 have the same thickness and are formed of the same material. The first mask layer 54 has a thickness of 3 to 20 nm and is formed of C (carbon). The second mask layer 56 has a thickness of 3 to 30 nm and is formed of Si (silicon). The resist layer 58 has a thickness of 30 to 300 nm and is formed of a negative resist (NBE22A manufactured by Sumitomo Chemical Co., Ltd., for example).

A predetermined servo pattern including contact holes is transferred onto the resist layer 58 of the starting body of the object to be processed 50 in the servo region, and a concavo-convex pattern having a fine pitch of 200 nm or less in the radial direction is transferred onto the resist layer 58 in the data region by nano-imprinting using a transfer device (not shown). Then, the resist layer 58 at the concave portion bottoms of the concavo-convex pattern is removed by reactive ion etching using $O_2$ (oxygen) gas as reactive gas. The resist layer 58 may be processed in the concavo-convex pattern by performing exposure and development.

The second mask layer 56 at the concave portion bottoms is removed by reactive ion etching using $SF_6$ (sulfur hexafluoride) as reactive gas. The first mask layer 54 at the concave portion bottoms is then removed by reactive ion etching using $O_2$ gas. Consequently, the continuous recording layer 52 is exposed at the concave portion bottoms.

Then, the continuous recording layer 52 at the concave portion bottoms is removed by ion beam etching using Ar (argon) gas as process gas. Thus, the continuous recording layer 52 is divided into a number of recording elements 16, so that the recording layer 14 is formed. The term "ion beam etching" used herein collectively means processing methods that emit ionized gas to an object to be processed and remove a part of the object, such as ion milling.

Figure 6:
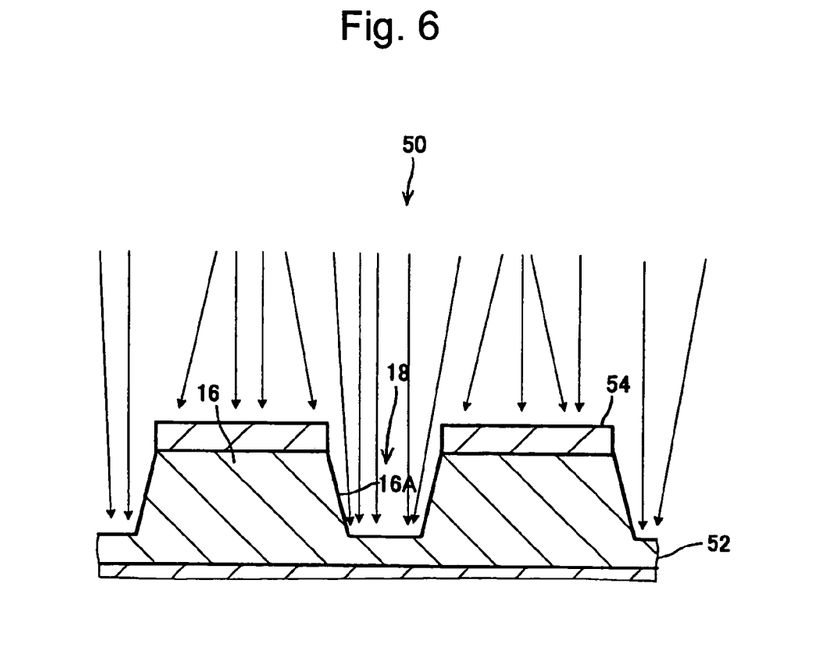
FIG. 6 is a schematic cross-sectional side view showing formation of the recording elements, in which the recording elements are enlarged.

During the ion beam etching, a part of the process gas is incident on a surface of the object to be processed 50 with a small angle with respect to a direction perpendicular to the surface of the object 50, as shown in FIG. 6. Thus, ends of a processed part of the continuous recording layer 52 and portions around those ends are hidden behind the first mask layer 54 with respect the part of the process gas, even if they are exposed from the first mask layer 54. Therefore, etching progresses slowly at those ends and in the portions around those ends, as compared with other portions. As a result, the side face 16A of the recording element 16 is inclined to face the surface of the object to be processed 50.

The inclination angle θ tends to be larger as the first mask layer 54 is thicker. Thus, the inclination angle θ can be adjusted by adjusting the thickness of the first mask layer 54. Moreover, as a gas pressure inside a chamber in which the object to be processed 50 is placed becomes higher, the straightness of ion beams tends to be degraded so as to make the inclination angle θ larger. Thus, the inclination angle θ can also be adjusted by adjusting the gas pressure inside the chamber. In addition, the inclination angle θ can also be adjusted by intentionally inclining the incident direction of the ion beams with respect to a direction perpendicular to the surface of the object to be processed 50. The adjustment of the inclination angle θ can also be achieved by combination of the above adjustment techniques.

Then, ion beam etching is performed until the concave portions 18 are formed to a substrate-side surface of the continuous recording layer 52, and thereafter the first mask layer 54 remaining on the upper surface of the recording elements 16 is completely removed by reactive ion etching using $O_2$ gas as reactive gas. Consequently, the object to be processed 50 in which the recording layer 14 is formed in a concavo-convex pattern over the substrate 12 is obtained, as shown in FIG. 5.

Figure 7:
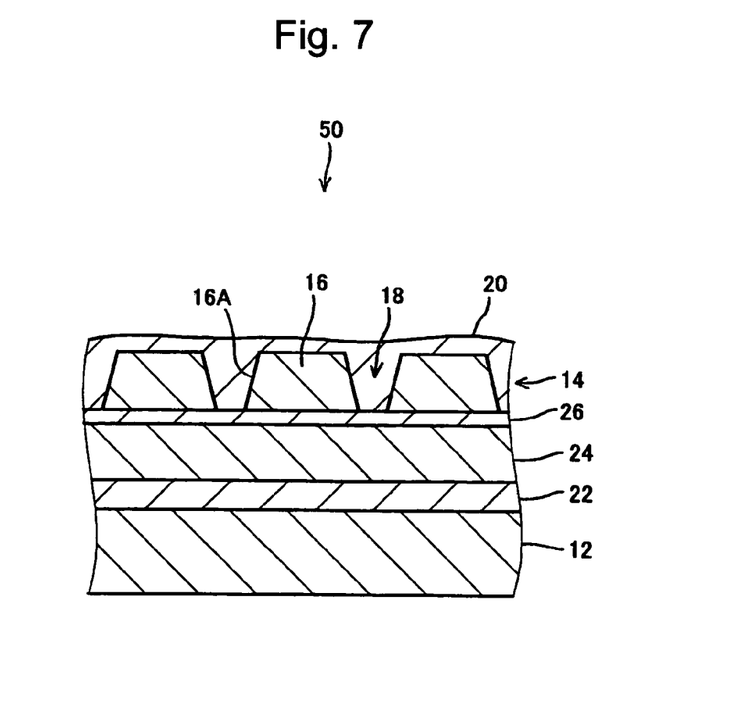
FIG. 7 is a schematic cross-sectional side view showing the shape of the object to be processed in which a non-magnetic material is deposited on the recording elements and concave portions are filled with the non-magnetic material.

Then, particles of $SiO_2$ (non-magnetic material 20) are deposited on the surface of the object to be processed 50 by bias sputtering in which a bias power is applied to the object to be processed 50, as shown in FIG. 7, so as to fill the concave portions 18 between the recording elements 16 with the $SiO_2$ particles (Step S104). The non-magnetic material 20 is deposited to completely cover the recording elements 16.

During the deposition, the non-magnetic material 20 can easily enter the concave portions 18 between the recording elements 16, thereby the concave portions 18 are almost completely filled with the non-magnetic material 20. This is because the side faces 16A of the recording elements 16 are inclined to face the surface of the object to be processed 50 and the inclination angle θ is set to be 5° or more. When the continuous recording layer 52 is divided into the recording elements 16, defects such as crystalline grain boundaries can be easily generated in the side faces 16A of the recording elements 16. However, since the concave portions 18 are filled with the non-magnetic material 20 almost completely and the non-magnetic material 20 is in close contact with the side faces 16A of the recording elements 16, generation of voids in the concave portions 18 can be suppressed and defects such as crystalline grain boundaries in the side faces 16A can be surely filled. Incidentally, it is difficult to fill those defects with crystalline material containing grain boundaries. However, the non-magnetic material 20 is $SiO_2$ and can be placed in an amorphous or microcrystalline state in which growth of grains is suppressed by choosing the deposition condition. Thus, the non-magnetic material 20 can come into close contact with the side faces 16A of the recording elements 16 made of a magnetic material, so that the defects such as crystalline grain boundaries can surely be filled with the non-magnetic material 20.

During the deposition of the non-magnetic material 20, collision of sputtering gas such as Ar gas with $SiO_2$ target causes $SiO_2$ particles to be scattered and deposited uniformly on the surface of the object to be processed 50 in a pattern following the concavo-convex shape of the recording elements. Thus, the surface of the non-magnetic material 20 tends to have a concavo-convex shape.

On the other hand, the sputtering gas is biased toward the object to be processed 50 by applying a bias power to the object 50. The biased sputtering gas collides with deposited $SiO_2$ and etches part of the deposited $SiO_2$. This etching action selectively removes a projecting portion of the deposited $SiO_2$ at a faster rate than other portions. Thus, the surface of the non-magnetic material 20 is gradually planarized. In an actual process, the deposition and the etching described above progress simultaneously. Since the deposition progresses more than the etching, the deposition of non-magnetic material 20 grows, while the concave-convex shape of the surface of the non-magnetic material 20 is suppressed small.

Therefore, the non-magnetic material 20 is deposited to have a surface of a suppressed concavo-convex shape, as shown in FIG. 7.

Figure 8:
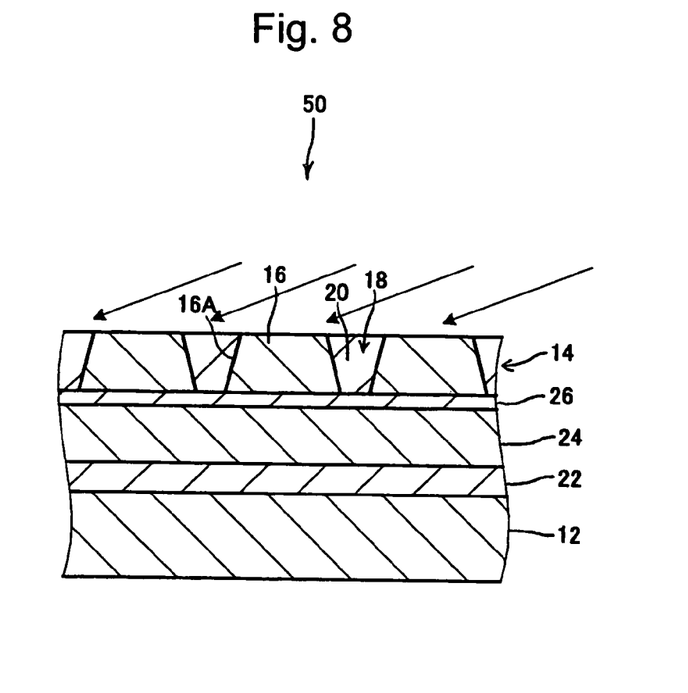
FIG. 8 is a schematic cross-sectional side view showing a process for planarizing the surface of the object to be processed.

Then, the non-magnetic material 20 is removed to the upper surface of the recording elements 16 by ion beam etching, so as to planarize the surfaces of the recording elements 16 and the non-magnetic material 20 (Step S106), as shown in FIG. 8. The planarizing effect can be enhanced by applying ion beams on the surface of the object to be processed 50 at an inclined with respect to the surface, as shown with arrows in FIG. 8.

The protective layer 28 is then formed on the upper surfaces of the recording elements 16 and the non-magnetic material 20 by CVD (Chemical Vapor Deposition) (Step S108). The lubricating layer 30 is applied onto the protective layer 28 by dipping (Step S110). In this manner, the magnetic recording medium 10 shown in FIG. 1 is completed.

Ar gas is used as the process gas of ion beam etching for processing the recording layer 14 in a concavo-convex pattern in the present exemplary embodiment. Alternatively, other rare gases such as Kr (krypton) gas and Xe (xenon) gas maybe used, for example. Alternatively, the recording layer 14 may be processed in a concavo-convex pattern by reactive ion etching using CO (carbon monoxide) gas and nitrogen-containing gas such as $NH_3$ (ammonia) gas as reactive gas. In this case, TiN (titanium nitride), Ta (tantalum) or the like can be used as the material of the first mask layer.

The non-magnetic material 20 is deposited by bias sputtering in the present exemplary embodiment. Alternatively, the non-magnetic material 20 may be formed by another deposition method such as ion beam deposition or plasma CVD. In this case, application of a bias power can also provide an effect of making the concavo-convex shape of the surface of the non-magnetic material 20 smaller. If the surface of the object to be processed 50 can be planarized sufficiently in the planarizing process (Step S106), the non-magnetic material 20 may be deposited by a deposition method in which no bias power is applied.

In the present exemplary embodiment, the first mask layer 54, the second mask layer 56, and the resist layer 58 are formed over the continuous recording layer 52 and the continuous recording layer 52 is divided by three steps of dry etching. However, the materials of the resist layer and the mask layers, the number and the thickness of the layers over the continuous recording layer, the type of dry etching, and the like are not specifically limited, as long as the continuous recording layer 52 can be processed in a desired concavo-convex pattern.

The recording layer 14 (continuous recording layer 52) is formed of a CoCrPt alloy in the present exemplary embodiment. However, the present invention can also be applied to a magnetic recording medium in which recording elements are formed from another material such as alloys containing at least one of iron group elements (Co, Fe (iron), Ni), or from a multilayer structure of those alloys.

The non-magnetic material 20 is $SiO_2$ in the present exemplary embodiment. Alternatively, other non-magnetic materials, for example, oxides other than $SiO_2$, nitrides such as TiN (titanium nitride), carbides such as SiC (silicon carbide) and TiC (titanium carbide), Ta (tantalum), TaSi, and Si may be used. Especially, non-magnetic materials such as oxides, nitrides, and carbides are excellent in their own chemical stability and are also excellent in chemical stability with respect to corrosion or the like caused by the contact with the recording layer 14 formed of a metallic magnetic material. Therefore, those non-magnetic materials can provide better recording and reproduction characteristics.

It is preferable to use an amorphous material in which no crystalline grain boundary is contained or a microcrystalline material. This is because defects in the side face 16A of the recording element 16 can be filled with such a material and such a material can enhance an effect of suppressing generation of voids.

The underlayer 22, the soft magnetic layer 24, and the seed layer 26 are formed below the recording layer 14 in the present exemplary embodiment. However, the structure below the recording layer 14 can be changed in accordance with the type of a magnetic recording medium. For example, one or two of the underlayer 22, the soft magnetic layer 24, and the seed layer 26 may be omitted. Alternatively, each of those layers 22, 24, and 26 may be composed of a plurality of layers. Alternatively, the recording layer may be formed directly on the substrate.

The magnetic recording medium 10 of the present exemplary embodiment is a perpendicular recording type discrete track magnetic disc in which the recording elements 16 are arranged at small intervals in a radial direction of tracks in the data region. However, the present invention can also be applied to a magnetic disc in which recording elements are arranged at small intervals in a circumferential direction of tracks (i.e., a direction along sectors), a magnetic disc in which recording elements are arranged at small intervals in the radial and circumferential directions of tracks, a PERM (Pre-embossed recording medium) type magnetic disc having a continuous recording layer in which a concavo-convex pattern is formed, and a magnetic disc having a spirally formed track. Moreover, the present invention can also be applied to a longitudinal recording type magnetic disc. Furthermore, the present invention can also be applied to a magneto optical disc such as an MO, a heat-assisted magnetic disc that uses magnetism and heat, and magnetic recording media each including a recording layer of a concavo-convex pattern and having a shape other than a disc-like shape, such as a magnetic tape.

EXAMPLE

Eight magnetic recording media 10 having different inclination angles θ were manufactured in the manner described in the above exemplary embodiment. A specific shape of the recording layer 14 is as follows.

Thickness: 17 nm
Pitch of concave portions and convex portions: 150 nm
Width of a recording element 16 (convex portion): 75 nm
Width of a concave portion: 75 nm The width of the recording element 16 and the width of the concave portion were measured at the height of the upper surface of the recording elements 16.

Figure 9:
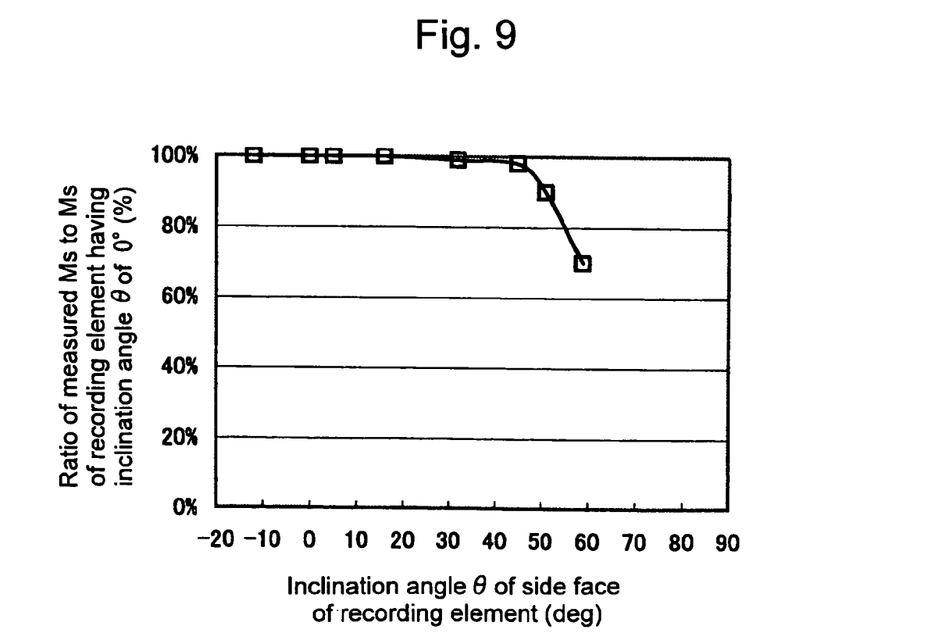
FIG. 9 is a graph showing a relationship between ratio of Ms of a recording layer of each magnetic recording medium 10 to Ms of a recording layer having an inclination angle of 0°, and the inclination angle θ.

For those magnetic recording media 10, Ms (saturation magnetization) of the recording layer 14 was measured by using VSM (Vibrating Sample magnetometer). In addition, a cross section of each of those magnetic recording media 10 was observed with a scanning electron microscope after the non-magnetic material 20 was deposited. Table 1 shows a relationship between a deposited state of the non-magnetic material 20 in the concave portion 18 and the inclination angle θ. In Table 1, x represents that there are many voids in the concave portion near the side face of the recording element, open circle represents that there are small voids only near the corner of the concave portion, and double circle represents that there is no void in the concave portion. Table 2 shows a relationship between a ratio of measured Ms of the recording layer 14 of each magnetic recording medium 10 to Ms of a recording layer 14 having an inclination angle of 0°, and the inclination angle θ. FIG. 9 is a graph corresponding to Table 2.

TABLE 1

| Inclination angle θ of side face of recording element (deg) | Quality of filling state of non-magnetic material | Detailed filling state of non-magnetic material |
| --- | --- | --- |
| −12 | X | Many voids near the side face of the recording element |
| 0 | X | Same as above |
| 5 | ○ | Small voids near corners of concave portion |
| 16 | ◎ | No void |
| 32 | ◎ | Same as above |
| 45 | ◎ | Same as above |
| 51 | ◎ | Same as above |
| 59 | ◎ | Same as above |

TABLE 2

| Inclination angle θ of side face of recording element (deg) | Ratio of measured Ms to Ms of recording element having inclination angle θ of 0° (%) |
| --- | --- |
| −12 | 100 |
| 0 | 100 |
| 5 | 100 |
| 16 | 100 |
| 32 | 99 |
| 45 | 98 |
| 51 | 90 |
| 59 | 70 |

It is found from Table 1 that, when the inclination angle θ is 5° or more, generation of voids along the side face 16A of the recording element 16 can be prevented, although a small number of voids were observed near the corner of the concave portion 18. Thus, when the inclination angle θ is 5° or more, an effect of suppressing a damage of the side face 16A by processing can be obtained. Moreover, when the inclination angle θ is 16° or more, the concave portion 18 can be completely filled with the non-magnetic material. Thus, the effect of suppressing the damage of the side face 16A by processing can be obtained. It is also possible to prevent corrosion of the recording element caused by moisture or the like entering the void in the concave portion 18 or oxidization of the side face of the recording element caused by oxygen or the like entering the void in the concave portion 18. Therefore, favorable magnetic characteristics can be surely obtained.

As shown in Table 2 and FIG. 9, when the inclination angle θ is larger than 45°, Ms of the measured recording layer 14 decreases largely with respect to Ms of the recording layer 14 having an inclination angle of 0°. However, when the inclination angle θ is not larger than 45°, the decrease of the Ms of the measured recording layer 14 is suppressed to 2% or less with respect to Ms of the recording layer 14 having an inclination angle of 0° and favorable magnetic characteristics can be obtained.

What is claimed is:

1. A magnetic recording medium being a plate-like body and comprising:
    a substrate;
    a recording layer formed in a predetermined concavo-convex pattern over the substrate, the recording layer including recording elements for recording information formed as convex portions of the concavo-convex pattern; and
    a non-magnetic material filling concave portions between the recording elements, wherein
    the recording elements are formed in a data region at a pitch of 200 nm or less,
    side faces of the recording elements are inclined to face a surface of the plate-like body on a side toward which the recording elements project in the concavo-convex pattern, and
    an inclination angle of the side faces of the recording elements with respect to a direction perpendicular to the surface is smaller than 90° and 5° or more.

2. The magnetic recording medium according to claim 1, wherein the inclination angle is 16° or more.

3. The magnetic recording medium according to claim 1, wherein the inclination angle is 45° or less.

4. The magnetic recording medium according to claim 2, wherein the inclination angle is 45° or less.

5. The magnetic recording medium according to claim 1, wherein a thickness of the recording layer is 25 nm or less.

6. The magnetic recording medium according to claim 2, wherein a thickness of the recording layer is 25 nm or less.

7. The magnetic recording medium according to claim 3, wherein a thickness of the recording layer is 25 nm or less.

8. The magnetic recording medium according to claim 4, wherein a thickness of the recording layer is 25 nm or less.

* * * * *